United States Patent [19]

Blackburn et al.

[11] Patent Number: 5,021,134
[45] Date of Patent: Jun. 4, 1991

[54] PRODUCTION OF NITROGEN COMPOUNDS

[75] Inventors: Stephen R. Blackburn, Middlesbrough; Anthony G. Jones, Sedgefield, both of England

[73] Assignee: Tioxide Group PLC, Cleveland, England

[21] Appl. No.: 519,674

[22] Filed: May 4, 1990

Related U.S. Application Data

[63] Continuation-in-part of Ser. No. 340,790, Apr. 20, 1989.

[30] Foreign Application Priority Data

Jun. 7, 1989 [GB] United Kingdom ................ 8913106

[51] Int. Cl.⁵ .................... C01B 21/06; C01B 21/068; C01B 21/076; C01B 35/14
[52] U.S. Cl. .................... 204/177; 423/284; 423/344; 423/409; 423/411; 423/412
[58] Field of Search ................ 204/177; 423/411, 284, 423/344, 409, 412

[56] References Cited

U.S. PATENT DOCUMENTS

| | | | |
|---|---|---|---|
| 2,952,599 | 9/1960 | Suchet | 204/177 |
| 3,345,134 | 10/1967 | Heymer et al. | 423/411 |
| 4,022,872 | 5/1977 | Carson et al. | 423/411 |

FOREIGN PATENT DOCUMENTS 1199811  7/1970 United Kingdom ................ 423/411

*Primary Examiner*—Wayne A. Langel
*Attorney, Agent, or Firm*—Banner, Birch, McKie & Beckett

[57] ABSTRACT

A method for the production of a nitride of zirconium, hafnium, silicon, germanium, tin, lead, boron, aluminium, gallium, indium or thallium either alone or as mixtures is claimed. Ammonia and a halide of at least one of these elements are heated by means of a direct electric current plasma in a non-oxidizing gas in a reactor in which recirculation is induced such that the defined recirculation ratio is greater than 2.5 and preferably greater than 4.0. Any titanium halide present shall be less then 40% by weight of mixed halides.

14 Claims, 3 Drawing Sheets

PRODUCTION OF NITROGEN COMPOUNDS

This application is a continuation-in-part of copending U.S. patent application Ser. No. 340,790, filed on Apr. 20, 1989.

The present invention provides a method for producing nitrogen compounds and particularly nitrides of certain elements. These elements are defined by reference to the Periodic Table of elements given in the 69th Edition of 'CRC Handbook of Chemistry and Physics' published by CRC Press Inc using the new notation and are elements of group 4 having an atomic number greater than 22 and less than 104, elements of group 14 having an atomic number greater than 6 and elements of group 13.

Previously the nitrogen compounds described above have been obtained by one of two general methods, those using a high temperature process or not. Those processes which do not involve reaction at a high temperature in the vapour phase generally produce a coarse nitride product which, after intensively milling, typically has a surface area of the order of 10 meters squared per gram and which also has metal contaminants such as iron or tungsten introduced by the milling.

Smaller particle sized products have been obtained by high temperature vapour phase methods of production but these contain amounts of oxygen and/or chlorine often exceeding 15% by weight.

According to the present invention a method for the manufacture of a nitride comprises heating ammonia and (a) a halide of one of the elements hereinbefore defined or (b) a mixture of halides containing a halide of at least one of the said elements and containing less than 40% by weight of a titanium halide to a chosen reaction temperature by means of an electric plasma formed in a stream of a non-oxidising gas generated by the discharge of direct current electricity between a pair of electrodes, introducing said heated gas through an inlet nozzle into a reactor and said reactor being constructed and operated so as to induce circulation of the gaseous material in said reactor such that the recirculation ratio (RR) is greater than 2.5 and preferably greater than 4.0 and collecting a nitride powder in which method the recirculation ratio is defined according to the formula $$RR = \frac{0.425 \, Mn \cdot R}{M \cdot Rn} \left[ \frac{D}{Dn} \right]^{\frac{1}{2}} - 0.425$$

wherein
Mn = mass flow of gas stream through inlet nozzle
R = internal radius of the reactor into which said nozzle flows
M = mass flow at a distance 4R downstream from the inlet nozzle
Rn = radius of inlet nozzle
Dn = density of gas stream passing through the inlet nozzle
D = density of gases in reactor at a distance 4R downstream from the inlet nozzle.

When the reactor is not of constant internal radius then the formula may still be used as an approximation using a mean value of the radius R.

As a further approximation densities are calculated neglecting reaction and dissociation.

Usually the concentration of halide of said element without considering reaction or dissociation lies in the range 3 to 30% preferably 3 to 20% and more preferably 4.5 to 15% molar of the total gas stream.

A diagrammatic representation of the reactor is shown in FIG. 1 of the attached drawings.

In the drawing the reactor 1 is of cylindrical shape and has a constant internal radius (R) along its length. The heated gas stream is introduced via inlet 13 through a nozzle 2 of internal radius Rn. A number of inlets 4 are provided for the reactants. The drawing shows the point X at a distance of 4 reactor radii along the reactor from the inlet nozzle and a means 10 of separating the product which is discharged at point 14.

The reactants are heated to an appropriate temperature by the stream of a gas which is non-oxidising gas such as an inert e.g. argon or nitrogen or hydrogen. This gas is heated by passing between a pair of electrodes supplied with a direct electric current at an appropriate level of power sufficient to introduce into the gaseous plasma thereby produced in the reactor sufficient heat energy to heat the reactants to the reaction temperature necessary. The power introduced into the gaseous plasma introduced through the inlet jet depends on various parameters and it is desirable to provide a net power in the plasma of 50 to 500 kcals per minute per mole of halide.

A wide range of voltages and currents can be used. Typical examples of voltages of the direct current supplied can range from 25 to 250 V and the current from 80 amps to 600 amps.

The reactants are a halide or a mixture of halides and ammonia. At least one of the reactants is a halide of one of the aforementioned elements. Specially at least one reactant is a halide of zirconium, hafnium, silicon, germanium, tin, lead, boron, aluminium, gallium, indium or thallium. Particularly useful nitride are produced when one of the reactants is a halide or zirconium, hafnium, boron, aluminium, silicon or tin. Typical halides are fluorides and chlorides of the aforementioned elements such as silicon tetrachloride, aluminium trichloride, boron trifluoride, zirconium tetrachloride and tin tetrachloride.

The process can be used to produce a nitride of a single element by reacting ammonia with a halide of only of the aforementioned elements. However mixtures of halides can be employed said mixture containing a halide of at least one of the aforementioned elements to produce mixed nitrides. The said mixture may contain in addition to a halide of the aforementioned elements halides of other elements except that the proportion of titanium halide shall not exceed 40% by weight of said mixture. Preferably the mixture of halides is substantially free of titanium halides.

The halide is introduced into the reactor separately from the ammonia in the region of the gaseous plasma through one or more inlets. When more than one halide is used the halides may be added separately directly to the reactor or premixed before adding to the reactor.

The ammonia is also introduced into the same region of the reactor through one or more inlets. The flow rate used will depend upon the power introduced to the gaseous but typical rates are 0.1 to 5.0 mole per minute for halide and 0.2 to 50 mole per minute for ammonia.

After reaction the product of the process of the invention can be removed from the gas stream by any suitable filtration technique either before or after cooling. Fabric filter cloth in the form of bag can be used as can a ceramic filter pre-heated if necessary. A scrubber supplied with a fluid can be used if desired and suitable fluids have been found to be water, aqueous ammonia or hydrochloric acid. Most conveniently scrubbing the gas stream with hydrochloric acid containing up to 20% HCl has been found to be a suitable technique.

One particular apparatus for carrying out the process of the invention will now be described by way of example only with reference to the accompanying drawings in which.

Figure 1:
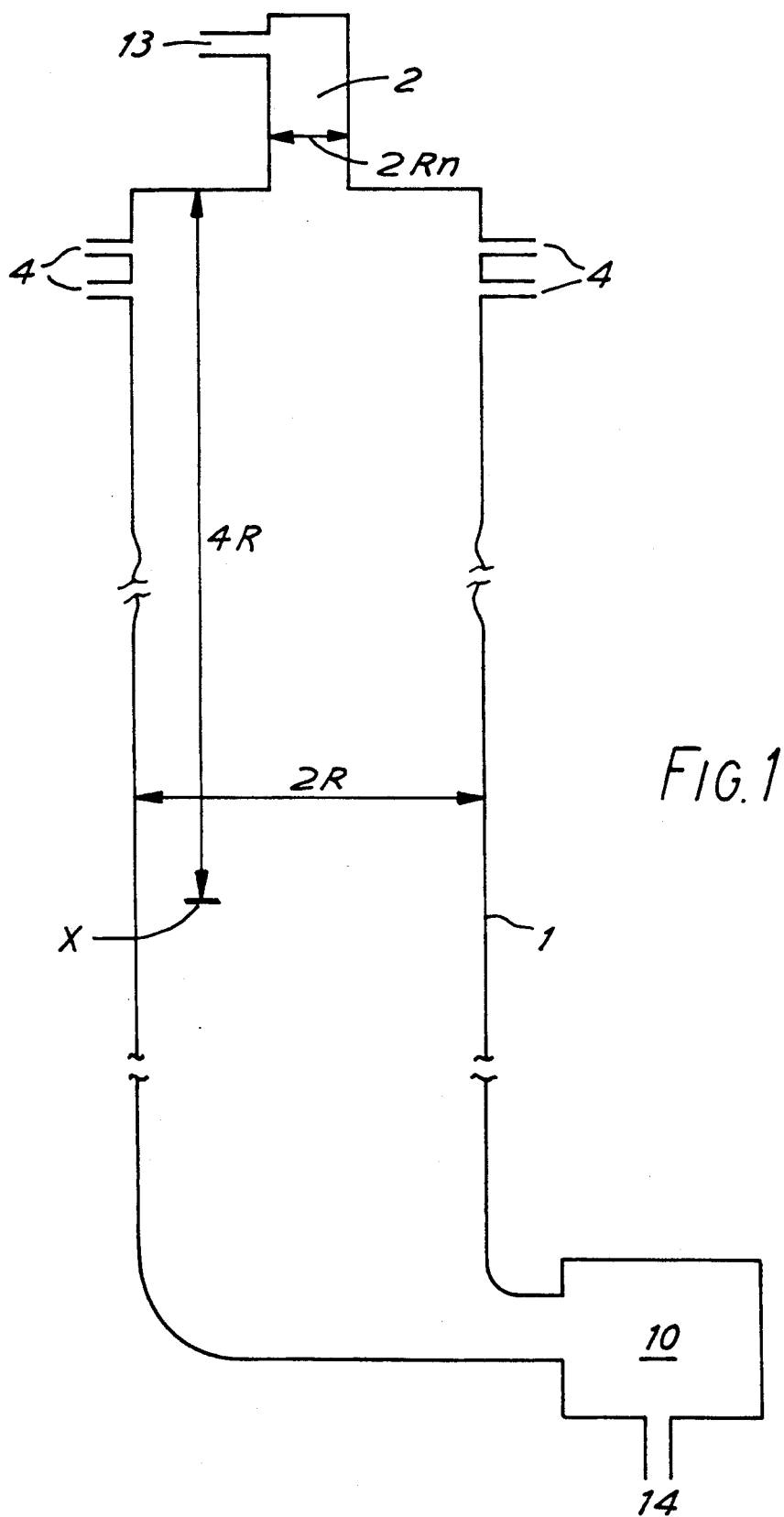
FIG. 1 is a diagrammatic representation of a reactor.
Figure 2:
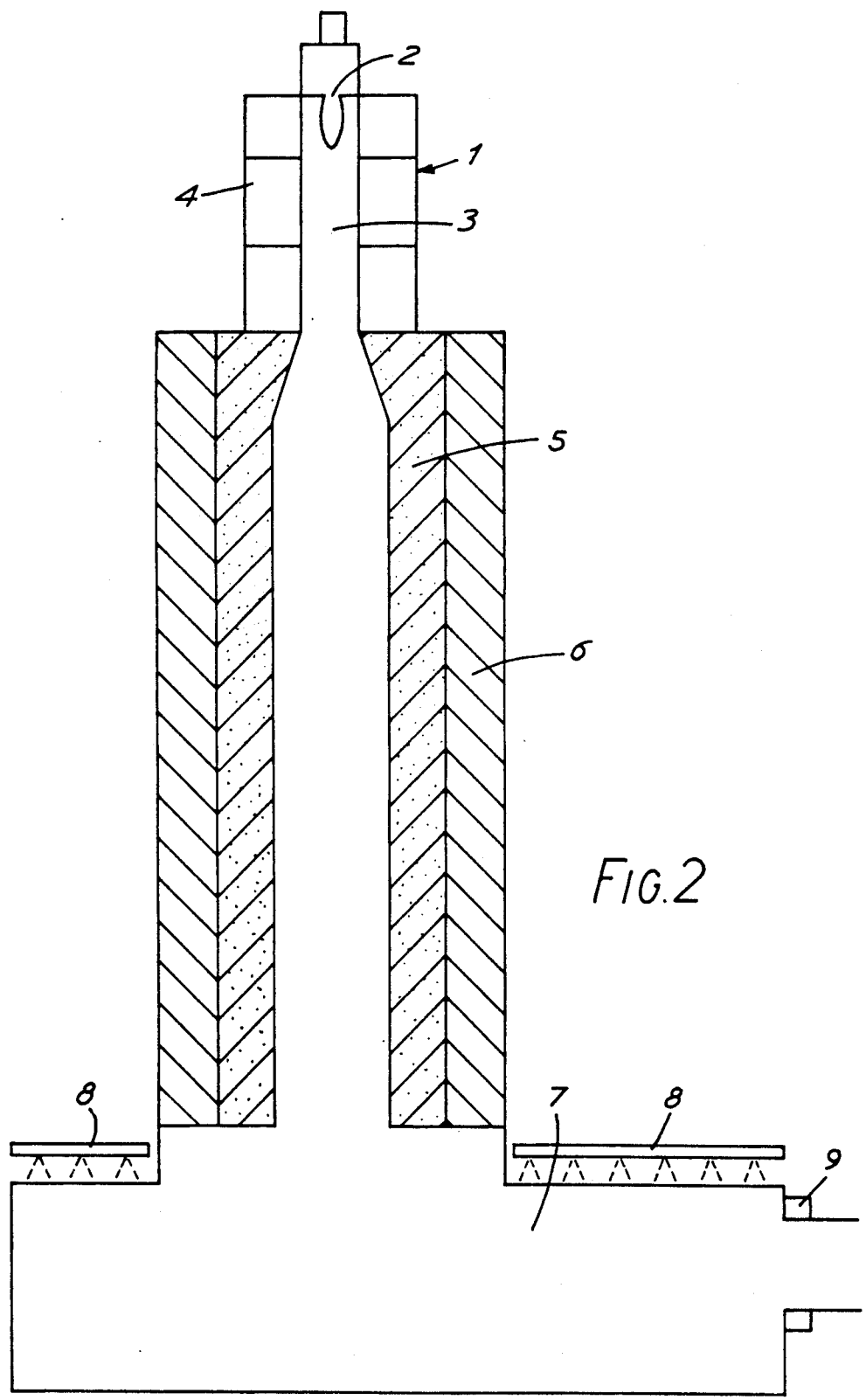
FIG. 2 is a part diagrammatic sectional view of a reactor and primary cooling section.
Figure 3:
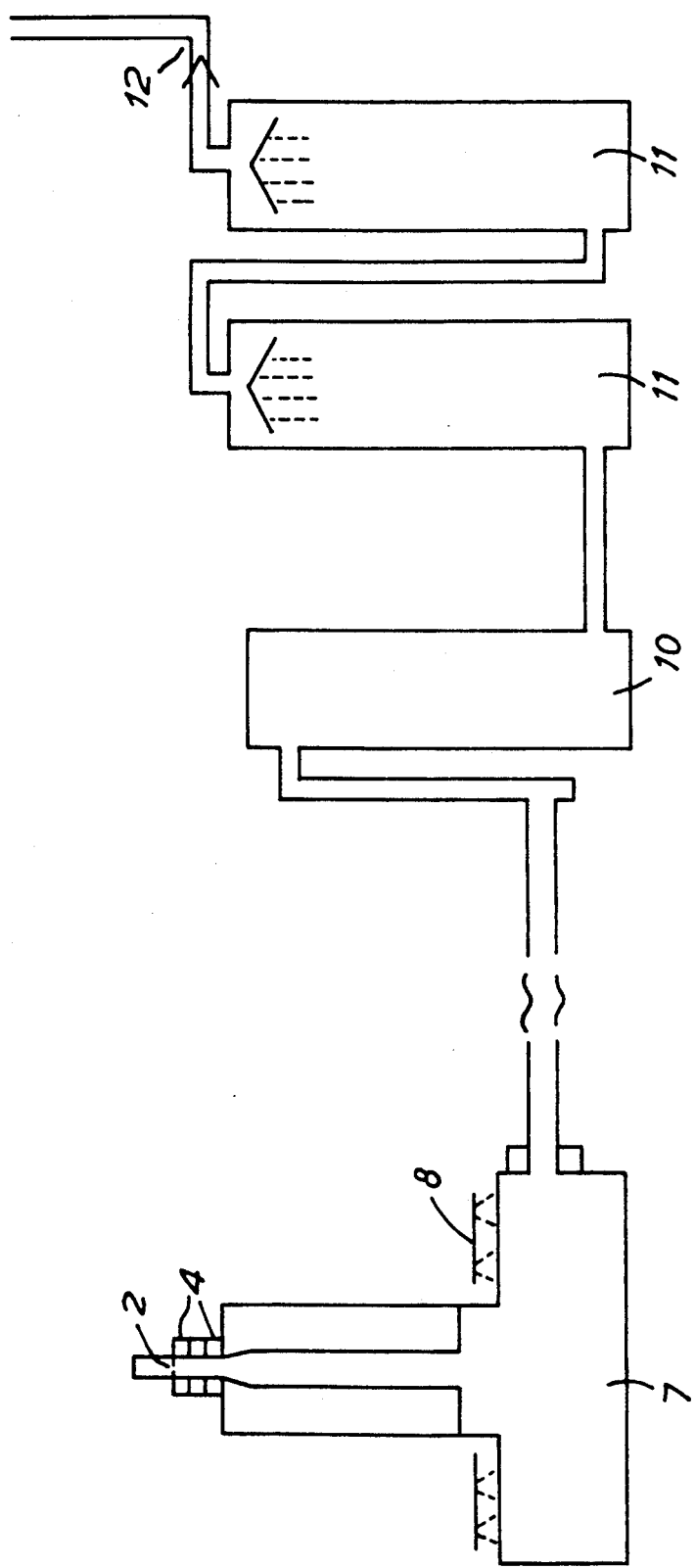
FIG. 3 is a diagrammatic view of the apparatus of FIG. 2 and associated scrubbers.

As shown in FIGS. 2 and 3 the reactor 1 is heated by means of a plasma flame from a nozzle 2 of a plasma gun through which a non-oxidising gas flows. The reactants (e.g. silicon tetrachloride and ammonia) are introduced into the initial reaction zone 3 through burner rings 4 constructed from nickel.

The hot gases then pass into a further reaction zone constructed from high alumina cement 5 insulated by a layer of insulating cement 6 from which they emerge into a primary cooling zone 7 constructed from steel and cooled by water sprays 8.

As the reactants leave cooling zone 7 they are quenched with nitrogen by means of a perforated aluminium quench ring 9 and they pass into the filter bank 10 in which the product is separated from the waste gases. Acidic waste gases (e.g. HCl) are removed by the two scrubbers 11 before discharge to atmosphere. The flow through the scrubbers 11 is maintained by an air venturi 12.

The products of the process of the present invention possess a controlled fine particle size and an amount of oxygen within clearly defined limits.

The particle size and oxygen content of the product formed in this process depends to some extent on the chemical nature of the nitride produced. Nevertheless this process allows control of these parameters within defined limits principally by control of the recirculation ratio (RR defined above). Silicon nitride can be prepared according to this process using silicon tetrachloride as the halide reactant having a specific surface area of about 80 meters squared per gram and a maximum oxygen content of about 15% when the recirculation ratio used was 4. The process is particularly useful for producing a nitride with a low oxygen content by utilizing a recirculation ratio higher than the minimum of 2.5 (e.g. 10). A higher recirculation ratio also leads to products with a lower specific surface area than those products formed when the recirculation ratio is closer to the minimum of 2.5.

The products of this invention can be used in a wide variety of ways some of which are described below. They are useful as raw ceramic powders either alone or in the formulation of composite materials such as cermets and mixed ceramic systems. They can be used to improve the hardness of wear parts and items for abrasive applications such as mechanical seals, brake pads and grinding and cutting tools. The chemical and thermal resistance of the products of this invention mean that materials produced from them are useful as structural materials at high and low temperatures and in corrosive environments. They therefore find use in producing articles such as crucibles, evaporating vessels, pump seals and pump impellers and engine components such as turbine blades and valve seats. Uses within the electronics industry depend upon the combination of electrical and thermal conductivity properties of the particular nitride but include use in integrated circuit substrates and in heat sinks.

The invention is illustrated by the following examples.

EXAMPLE 1

A DC plasma was established in argon flowing at the rate of 5.1 mole/min through a pair of electrodes supplied with direct current at 43.9 volts and 385 amps. When the reactor positioned below the plasma inlet had stabilized in temperature silicon tetrachloride at a rate of 0.5 mole per minute and ammonia gas at a rate of 1.4 mole per minute were fed into the area surrounding the tail flame of the plasma. The plasma introduced heat into the reactor at a rate of 154 kcal per minute (10.8 Kwatt). The concentration of the silicon tetrachloride was 6.8 mole % and the variables in the equation determining the recirculation ratio had values of $Mn=204$ g/min; $M=329$ g/min; $Rn=3$ mm; $R=38$ mm; $Dn=7.6 \times 10^{-5}$ g cm$^{-3}$ and $D=3.7 \times 10^{-4}$ g cm$^{-3}$.

The recirculation ratio was 10.3.

The product was removed from the gas stream by filtration using a fabric filter bag formed from polytetrafluoroethylene and after removal of ammonium chloride by heat treatment in a stream of nitrogen at 1100° C. had a surface area (BET) of 33 m$^2$ g$^{-1}$ and an oxygen content of 5.9% by weight.

EXAMPLE 2

Example 1 was repeated but employing a plasma which introduced heat into the reactor at the rate of 108 kcals per minute (7.6 Kwatt). Silicon tetrachloride at a rate of 0.5 mole per minute and ammonia gas at a rate of 2.6 mole per minute were fed into the area surrounding the tail of the plasma. The concentration of silicon tetrachloride was 6.1 mole % and the values of the variables used to determine the recirculation ratio were $Mn=188$ g/min; $M=333$ g/min; $Rn=3$ mm; $R=38$ mm; $Dn=9.9 \times 10^{-5}$ g cm$^{-3}$ and $D=4.1 \times 10^{-4}$ g cm$^{-3}$.

The recirculation ratio was 5.8.

The product was collected in a filter bag made from polytetrafluoroethylene and after heat treatment to remove ammonium chloride had a BET surface area of 52 m$^2$ g$^{-1}$ and contained 9.2% oxygen by weight.

EXAMPLE 3

Example 1 was repeated but employing a plasma which introduced heat into the reactor at the rate of 156 kcal per minute (10.9 Kwatt). Silicon tetrachloride at a rate of 0.4 mole per minute and ammonia gas at a rate of 2.5 mole per minute were fed into the area surrounding the tail of the plasma. The concentration of silicon tetrachloride was 4.9 mole % and the values of the variables used to determine the recirculation ratio were $Mn=192$ g/min; $M=319$ g/min; $Rn=3$ mm; $R=38$ mm; $D=7.7 \times 10^{-5}$ g cm$^{-3}$; $D=3.4 \times 10^{-4}$ g cm$^{-3}$.

The recirculation ratio was 6.7.

The product was collected using a scrubber filter containing 10% hydrochloric acid and had a surface area (BET) of 66 m$^2$ g$^{-1}$ and an oxygen content of 8.6% by weight.

EXAMPLE 4

A DC plasma was established in argon flowing at the rate of 4.8 moles/min through a pair of electrodes supplied with a direct current at 43.5 volts and 420 amps.

When the reactor positioned below the plasma inlet had stablised in temperature vapourized aluminum chloride at a rate of 0.46 mole per minute and ammonia gas at a rate of 1.3 mole per minute were fed into the area surrounding the tail flame of the plasma. The plasma introduced heat into the reactor at a rate of 153 kcal per minute (10.7 k watt). The concentration of the aluminium chloride was 4.5 mole % and the variables in the equation determining the recirculation ratio had values of $Mn = 190.4$ g/min; $M = 425.1$ g/min, $Rn = 3$ mm; $R = 55$ mm; $Dn = 7.2 \times 10^{-5}$ g cm$^{-3}$ and $D = 4.0 \times 10^{-4}$ g cm$^{-3}$.

The recirculation ratio was 7.8.

The product was removed from the gas stream by filtration using a fabric filter bag formed from polytetrafluoroethylene and after removal of ammonium chloride by heat treatment in a stream of argon at 1100° C. had a surface area (BET) of 16 m$^2$ g$^{-1}$ and an oxygen content of 4.3% by weight.

The product was sintered alone at 1900° C. for 0.5 hrs to give a body with 96% of the theoretical density. When the product was sintered together with 3% by weight yttrium oxide at 1800° C. for 1 hr the body produced had a density equal to 98% of the theoretical density.

EXAMPLE 5

A DC plasma was established in nitrogen flowing at the rate of 2.4 mole/min through a pair of electrodes supplied with direct current at 135 volts and 245 amps. When the reactor positioned below the plasma inlet had stabilized in temperature silicon tetrachloride at a rate of 0.45 mole per minute and ammonia gas at a rate of 2.5 mole per minute were fed into the area surrounding the tail flame of the plasma. The plasma introduced heat into the reactor at a rate of 330 kcal per minute (23.1 k watt). The concentration of the silicon tetrachloride was 7.0 mole % and the variables in the equation determining the recirculation ratio had values of $Mn = 68.3$ g/min; $M = 215.3$ g/min; $Rn = 3$ mm; $R = 55$ mm; $Dn = 2.6 \times 10^{-5}$ g cm$^{-3}$ and $D = 2.1 \times 10^{\times 4}$ g cm$^{-3}$.

The recirculation ratio was 6.6.

The product was collected in a filter bag made from polytetrafluoroethylene and after removal of ammonium chloride with water followed by drying had a BET surface area of 26 m$^2$ g$^{-1}$ and contained 2.6% oxygen by weight.

We claim:

1. A method for the manufacture of a nitride comprising heating ammonia and a halide selected from the class consisting of halides of zirconium, hafnium, silicon, germanium, tin, lead, boron, aluminium gallium, indium and thallium and mixtures of said halides containing less than 40% by weight of a titanium halide to a chosen reaction temperature by means of an electric plasma formed in a stream of a non-oxidizing gas generated by the discharge of direct current electricity between a pair of electrodes, introducing said heated gas through an inlet nozzle into a reactor and said reactor being so constructed and operated as to induce circulation of gaseous material in the reactor such that the recirculation ratio (RR) is greater than 2.5 and collecting a nitride powder in which method the recirculation ratio is defined according to the formula $$RR = \frac{0.425 \, Mn \cdot R}{M \cdot Rn} \left[ \frac{D}{Dn} \right]^{\frac{1}{2}} - 0.425$$

wherein
 $Mn$ = mass flow of gas stream through inlet nozzle
 $R$ = internal radius of the reactor into which said nozzle flows
 $M$ = mass flow at a distance 4R downstream from the inlet nozzle
 $Rn$ = radius of inlet nozzle
 $Dn$ = density of gas stream passing through inlet nozzle
 $D$ = density of gases in reactor at a distance 4R downstream from the inlet nozzle.

2. A method according to claim 1 in which the recirculation ratio is greater than 4.

3. A method according to claim 1 in which the concentration of the halide or halides without considering reaction or dissociation lies in the range 3 to 30 molar per cent of the total gas stream.

4. A method according to claim 3 in which said concentration of halide or halides lies in the range 3 to 20 molar per cent.

5. A method according to claim 3 in which said concentration of halide or halides lies in the range 4.5 to 15 molar per cent.

6. A method according to claim 1 in which the net power provided in the said plasma is from 50 to 500 kcals per minute per mole of halide.

7. A method according to claim 1 in which the direct current electricity has an amperage of from 80 amps to 600 amps and a voltage of from 25 volts to 250 volts.

8. A method according to claim 1 in which at least one halide is selected from the class consisting of silicon tetrachloride, aluminium trichloride, boron trifluoride, zirconium tetrachloride and tin tetrachloride.

9. A method according to claim 1 in which the mixture of halide is substantially free of titanium halide.

10. A method according to claim 1 in which the halide or mixture of halides is introduced into the reactor at a rate of 0.1 to 5.0 mole per minute.

11. A method according to claim 1 in which the ammonia is introduced into the reactor at a rate of 0.2 to 50 mole per minute.

12. A method according to claim 1 in which the non-oxidizing gas is argon, nitrogen or hydrogen.

13. A method according to claim 1 in which more than one halide is used and the halides are separately added to the reactor.

14. A method according to claim 1 in which the nitride powder is collected by deposition in hydrochloric acid solution containing up to 20% hydrochloric acid.

* * * * *